(12) United States Patent
Gill

(10) Patent No.: US 7,697,242 B2
(45) Date of Patent: *Apr. 13, 2010

(54) METHOD FOR PROVIDING A SELF-PINNED DIFFERENTIAL GMR SENSOR HAVING A BIAS STRUCTURE COMPRISING LAYERS OF FERROMAGNETIC AND NON-MAGNETIC MATERIAL SELECTED TO PROVIDE A NET-ZERO MAGNETIC MOMENT

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/852,139

(22) Filed: Sep. 7, 2007

(65) Prior Publication Data
US 2007/0297102 A1 Dec. 27, 2007

Related U.S. Application Data

(62) Division of application No. 10/672,992, filed on Sep. 26, 2003, now Pat. No. 7,298,595.

(51) Int. Cl.
G11B 5/39 (2006.01)
(52) U.S. Cl. .................................. 360/314; 360/324.12

(58) Field of Classification Search ................. 360/314, 360/324.12
See application file for complete search history.

(56) References Cited

U.S. PATENT DOCUMENTS

| 5,768,069 A * | 6/1998 | Mauri | 360/314 |
| 7,298,595 B2 * | 11/2007 | Gill | 360/314 |
| 2004/0012898 A1 * | 1/2004 | Hasegawa | 360/324.12 |

* cited by examiner

Primary Examiner—Craig A. Renner
(74) Attorney, Agent, or Firm—Merchant & Gould

(57) ABSTRACT

A method for providing a self-pinned differential GMR sensor and self-pinned differential GMR sensor. The differential GMR head includes two self-pinned GMR sensors separated by a gap layer. The gap layer may act as a bias structure to provide antiparallel magnetizations for the first and second free layers without using an antiferromagnetic layer. The gap layer may include four NiFe ferromagnetic layers separated with three interlayers. The gap may also be formed to include a structure defined by $Ta/Al_2O_3/NiFeCr/CuOx$. One of the pinned layer may include three ferromagnetic layers so that the top ferromagnetic layer of the bottom pinned layer and the bottom ferromagnetic layer of the bottom pinned layer have a magnetization 180° out of phase. The self-pinned GMR sensors may include synthetic free layers that includes a first free sublayer, an interlayer and a second free sublayer that are biased 180° out of phase.

5 Claims, 9 Drawing Sheets

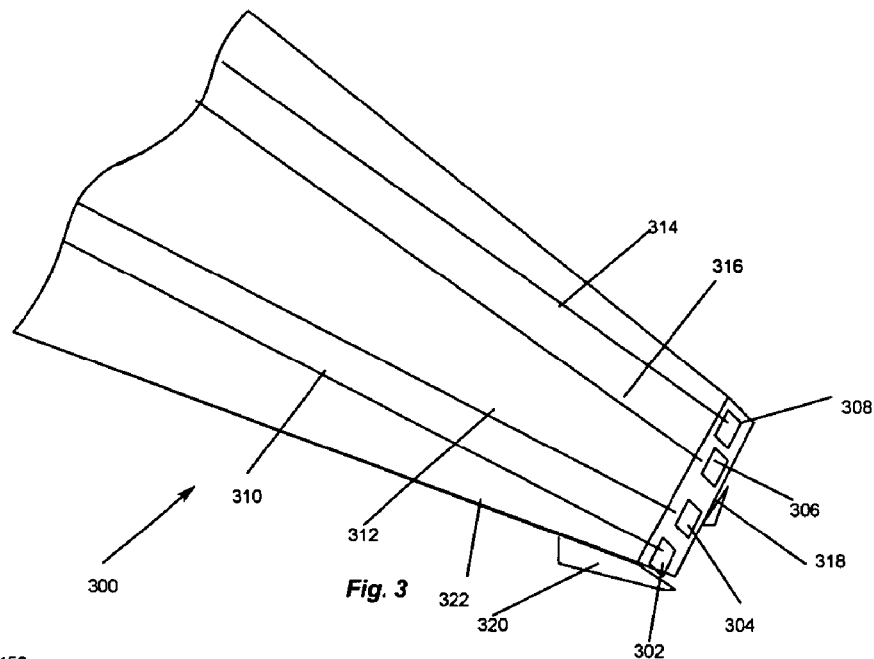
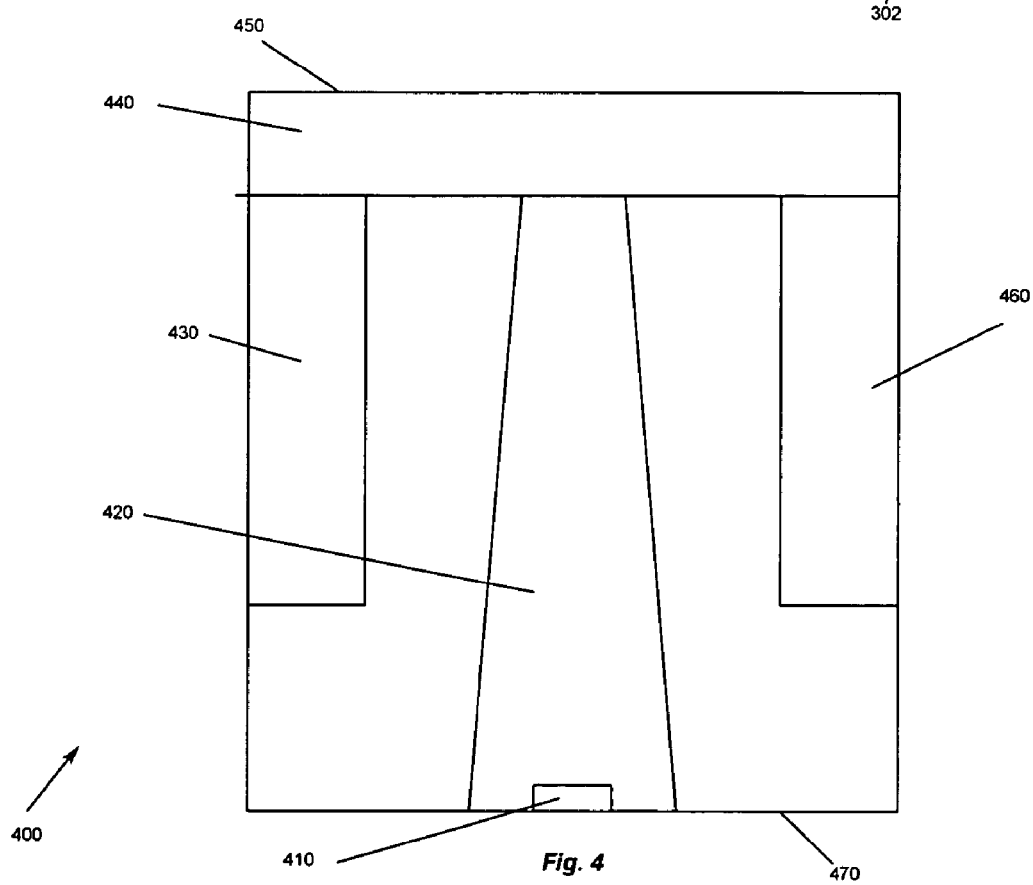

METHOD FOR PROVIDING A SELF-PINNED DIFFERENTIAL GMR SENSOR HAVING A BIAS STRUCTURE COMPRISING LAYERS OF FERROMAGNETIC AND NON-MAGNETIC MATERIAL SELECTED TO PROVIDE A NET-ZERO MAGNETIC MOMENT

BACKGROUND OF THE INVENTION

1. Field of the Invention

This invention relates in general to sensors for magnetic storage devices, and more particularly to a method for providing a self-pinned differential GMR sensor and self-pinned differential GMR sensor.

2. Description of Related Art

Magnetic recording is a key segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was used for data storage. Areal density continues to grow due to improvements in magnet recording heads, media, drive electronics, and mechanics.

Magnetic recording heads have been considered the most significant factor in areal-density growth. The ability of the magnetic recording heads to both write and subsequently read magnetically recorded data from the medium at data densities well into the gigabits per square inch (Gbits/in$^2$) range gives hard disk drives the power to remain the dominant storage device for many years to come.

Important components of computing platforms are mass storage devices including magnetic disk and magnetic tape drives, where magnetic tape drives are popular, for example, in data backup applications. Write and read heads are employed for writing magnetic data to and reading magnetic data from the recording medium. The read and write heads are connected to processing circuitry that operates according to a computer program to implement the writing and reading functions.

A magnetoresistive (MR) sensor changes resistance in the presence of a magnetic field. Recorded data can be read from a recorded magnetic medium, such as a magnetic disk, because the magnetic field from the recorded magnetic medium causes a change in the direction of magnetization in the read element, which causes a corresponding change in the sensor resistance.

A magnetoresistive (MR) sensor detects magnetic field signals through the resistance changes of a sensing element as a function of the strength and direction of magnetic flux being sensed by the sensing element. Conventional MR sensors, such as those used as MR read heads for reading data in magnetic recording disk and tape drives, operate on the basis of the anisotropic magnetoresistive (AMR) effect of the bulk magnetic material, which is typically permalloy. A component of the read element resistance varies as the square of the cosine of the angle between the magnetization direction in the read element and the direction of sense current through the read element. Recorded data can be read from a magnetic medium, such as the magnetic disk in a magnetic disk drive, because the external magnetic field from the recorded magnetic medium (the signal field) causes a change in the direction of magnetization in the read element, which in turn causes a change in resistance of the read element. This change in resistance may be used to detect magnetic transitions recorded on the recording media.

In the past several years, prospects of increased storage capacity have been made possible by the discovery and development of sensors based on the giant magnetoresistance (GMR) effect, also known as the spin-valve effect. In a spin valve sensor, the GMR effect varies as the cosine of the angle between the magnetization of the pinned layer and the magnetization of the free layer. Recorded data can be read from a magnetic medium because the external magnetic field from the recorded magnetic medium, or signal field, causes a change in the direction of magnetization of the free layer, which in turn causes a change in the resistance of the spin valve sensor and a corresponding change in the sensed current or voltage.

Magnetic sensors utilizing the GMR effect are found in mass storage devices such as, for example, magnetic disk and tape drives and are frequently referred to as spin-valve sensors. The spin-valve sensors are divided into two main categories, the Anti-FerroMagnetically (AFM) pinned spin valve and the self-pinned spin valve. An AFM pinned spin valve comprises a sandwiched structure consisting of two ferromagnetic layers separated by a thin non-ferromagnetic layer. One of the ferromagnetic layers is called the pinned layer because it is magnetically pinned or oriented in a fixed and unchanging direction by an adjacent AFM layer, commonly referred to as the pinning layer, which pins the magnetic orientation of the pinned layer through anti-ferromagnetic exchange coupling by the application of a sense current field. The other ferromagnetic layer is called the free or sensing layer because the magnetization is allowed to rotate in response to the presence of external magnetic fields.

In the self-pinned spin valve, the magnetic moment of the pinned layer is pinned in the fabrication process, i.e., the magnetic moment is set by the specific thickness and composition of the film. The self-pinned layer may be formed of a single layer of a single material or may be a composite layer structure of multiple materials. It is noteworthy that a self-pinned spin valve requires no additional external layers applied adjacent thereto to maintain a desired magnetic orientation and, therefore, is considered to be an improvement over the anti-ferromagnetically pinned spin valve.

As systems are pushed to higher read density, higher magnetic bit size or decreased recording media size, the available magnetic flux is decreased. In addition, sensitivity may be decreased from thermal noise. For example, while the head is flying over the disk surface, it may hit a particle (contamination). The energy of this collision will be dissipated in the form of heat causing the temperature of the head to increase, causing an increase in the resistance of the head ultimately resulting in a signal that may be even higher than the magnetic signal from a transition. In order to sense these smaller signals and increase areal density, read heads with greater sensitivities are needed.

A scheme to increase the signal to noise ratio of a spin valve head is to employ first and second spin valve sensors, which are differentially detected for common mode noise rejection. A differential spin valve structure employs first and second spin valve sensors that produce responses of opposite polarities in reaction to a magnetic field of a single polarity. The opposite polarity responses are processed by a differential amplifier for common mode rejection of noise and for producing an enhanced combined signal. The first and second spin valve sensors are magnetically separated by a gap layer. The first spin valve sensor is connected in series with first and second leads and the second spin valve sensor is connected in series with third and fourth leads. The second and fourth leads are electrically interconnected and the first and third leads are adapted for connection to the differential amplifier.

While a differential GMR head provides an increased signal to noise ratio, the differential GMR head is significantly thicker than a single pinned spin valve sensor because of the thicknesses of the first and second pinning layers. While the thicknesses of the various layers of a typical spin valve sensor range between 10 Å-70 Å, the thicknesses of the antiferromagnetic pinning layers vary in a range from 120 Å-425 Å. Iridium manganese (IrMn) permits the thinnest antiferromagnetic pinning layer of about 120 Å whereas an antiferromagnetic pinning layer composed of nickel oxide (NiO) is typically 425 Å.

Further, the range of blocking temperature for the interface at the antiferromagnetic layer is relatively low. These temperatures can be reached by certain thermal effects during operation of the disk drive, such as an increase in the ambient temperature inside the drive, heating of the SV sensor due to the bias current, and rapid heating of the SV sensor due to the head carrier contacting asperities on the disk. In addition, during assembly of the disk drive the SV sensor can be heated by current resulting from an electrostatic discharge. If any of these thermal effects cause the SV sensor to exceed the antiferromagnet's blocking temperature the magnetization of the pinned layer will no longer be pinned in the desired direction. This will lead to a change in the SV sensor's response to an externally applied magnetic field, and thus to errors in data read back from the disk.

It can be seen that there is a need for a method for providing a differential GMR sensor and GMR sensor that is smaller and more sensitive.

SUMMARY OF THE INVENTION

To overcome the limitations in the prior art described above, and to overcome other limitations that will become apparent upon reading and understanding the present specification, the present invention discloses a method for providing a self-pinned differential GMR sensor and self-pinned differential GMR sensor.

The present invention solves the above-described problems by providing a differential GMR head that eliminates the need for antiferromagnetic (AFM) pinning layers.

A method in accordance with the principles of the present invention includes forming a first shield and first gap layer, forming a first self-pinned GMR sensor having a first pinned layer, a first spacer layer and a first free layer, forming a bias structure over the first free layer, wherein the bias structure is formed to provide antiparallel magnetizations for the first and second free layers without using an antiferromagnetic layer and forming a second self-pinned GMR sensor having a second pinned layer, a second spacer layer and a second free layer.

In another embodiment of the present invention, a differential GMR sensor is provided. The differential GMR sensor includes a first self-pinned GMR sensor having a first pinned layer, a first spacer layer and a first free layer, a bias structure over the first free layer, wherein the bias structure is formed to provide antiparallel magnetizations for the first and second free layers without using an antiferromagnetic layer and a second self-pinned GMR sensor having a second pinned layer, a second spacer layer and a second free layer.

In another embodiment of the present invention, a magnetic disk recording system is provided. The magnetic disk recording system includes a magnetic storage medium having a plurality of tracks for recording of data and a magnetic transducer maintained in a closely spaced position relative to the magnetic storage medium during relative motion between the magnetic transducer and the magnetic storage medium, the magnetic transducer including a magnetoresistive read sensor, the magnetoresistive read sensor further includes a first self-pinned GMR sensor having a first pinned layer, a first spacer layer and a first free layer, a bias structure over the first free layer, wherein the bias structure is formed to provide antiparallel magnetizations for the first and second free layers without using an antiferromagnetic layer and a second self-pinned GMR sensor having a second pinned layer, a second spacer layer and a second free layer.

In another embodiment of the present invention, another differential GMR sensor is provided. This differential GMR sensor includes first means having a first pinned layer, a first spacer layer and a first free layer, a second self-pinned GMR sensor having a second pinned layer, a second spacer layer and a second free layer and means for biasing the first and second pinned layers to provide antiparallel magnetizations for the first and second free layers without using an antiferromagnetic layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method for providing a self-pinned differential GMR sensor and self-pinned differential GMR sensor. The structure of the differential GMR head eliminates the need for antiferromagnetic (AFM) pinning layers.

Figure 1:
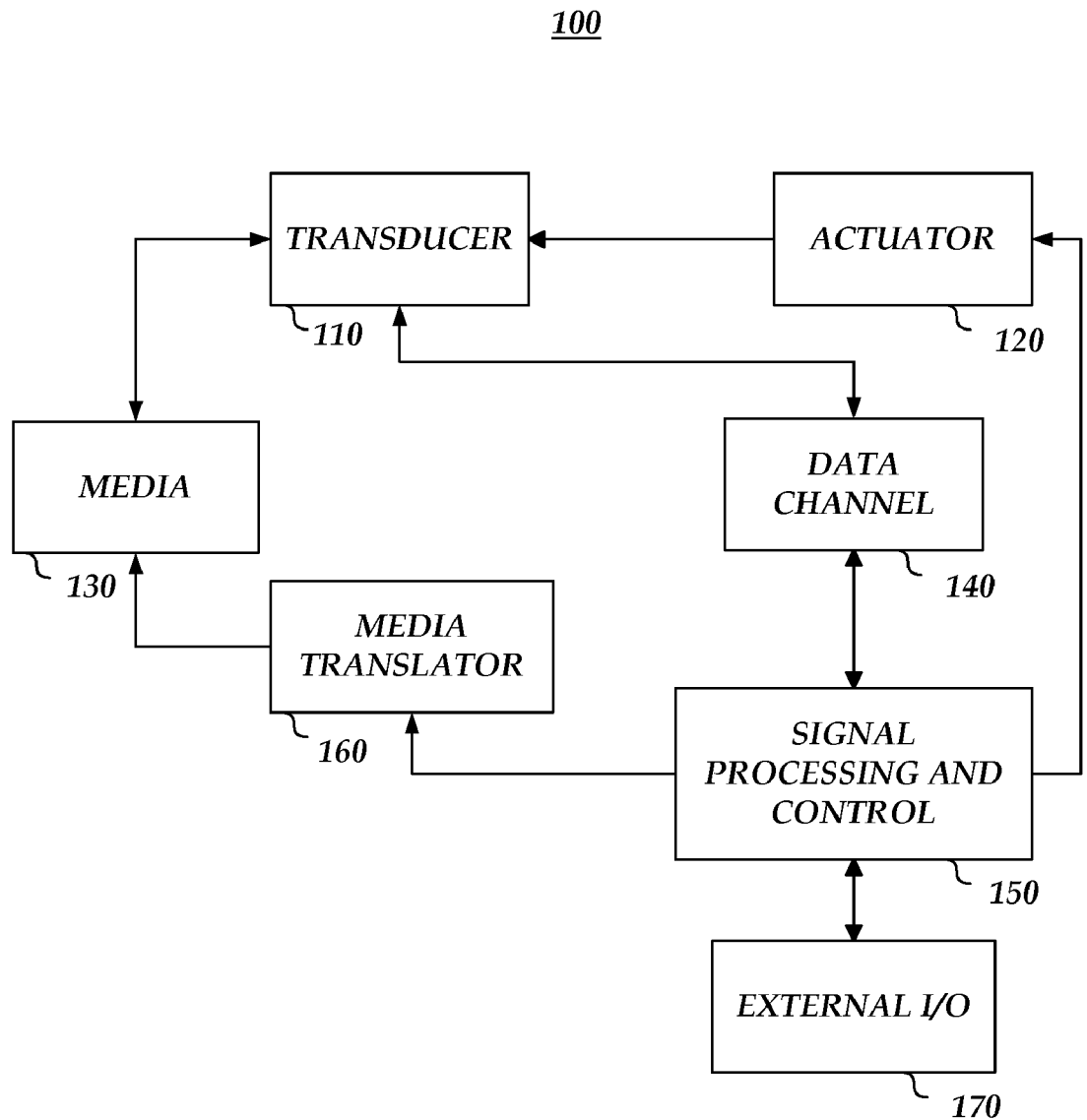
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
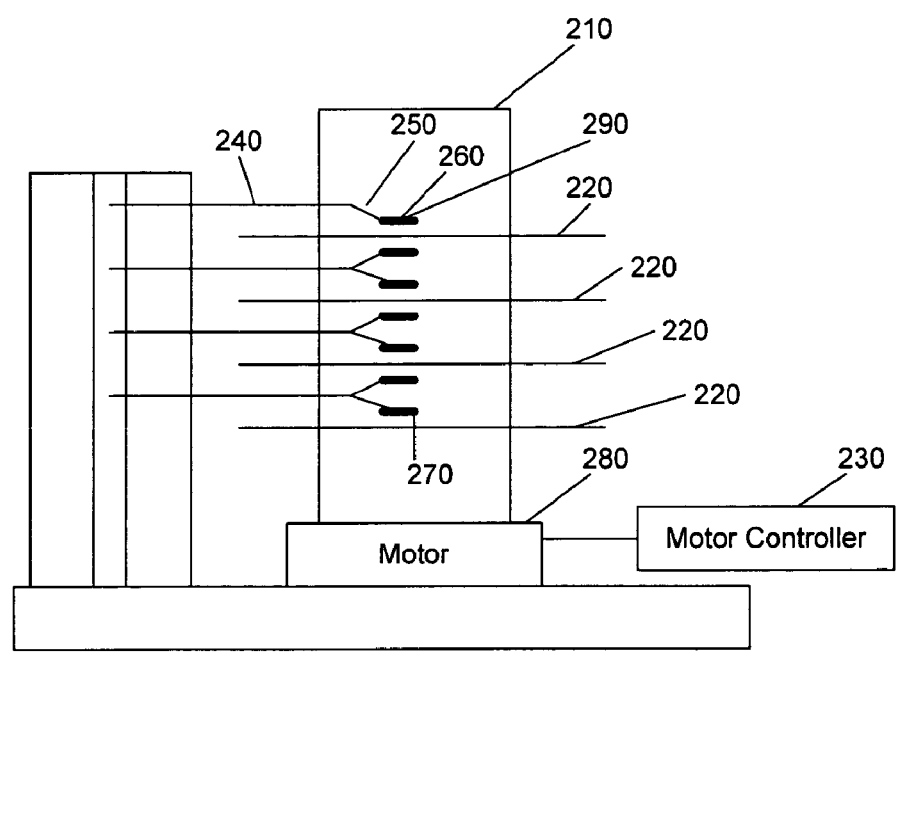
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
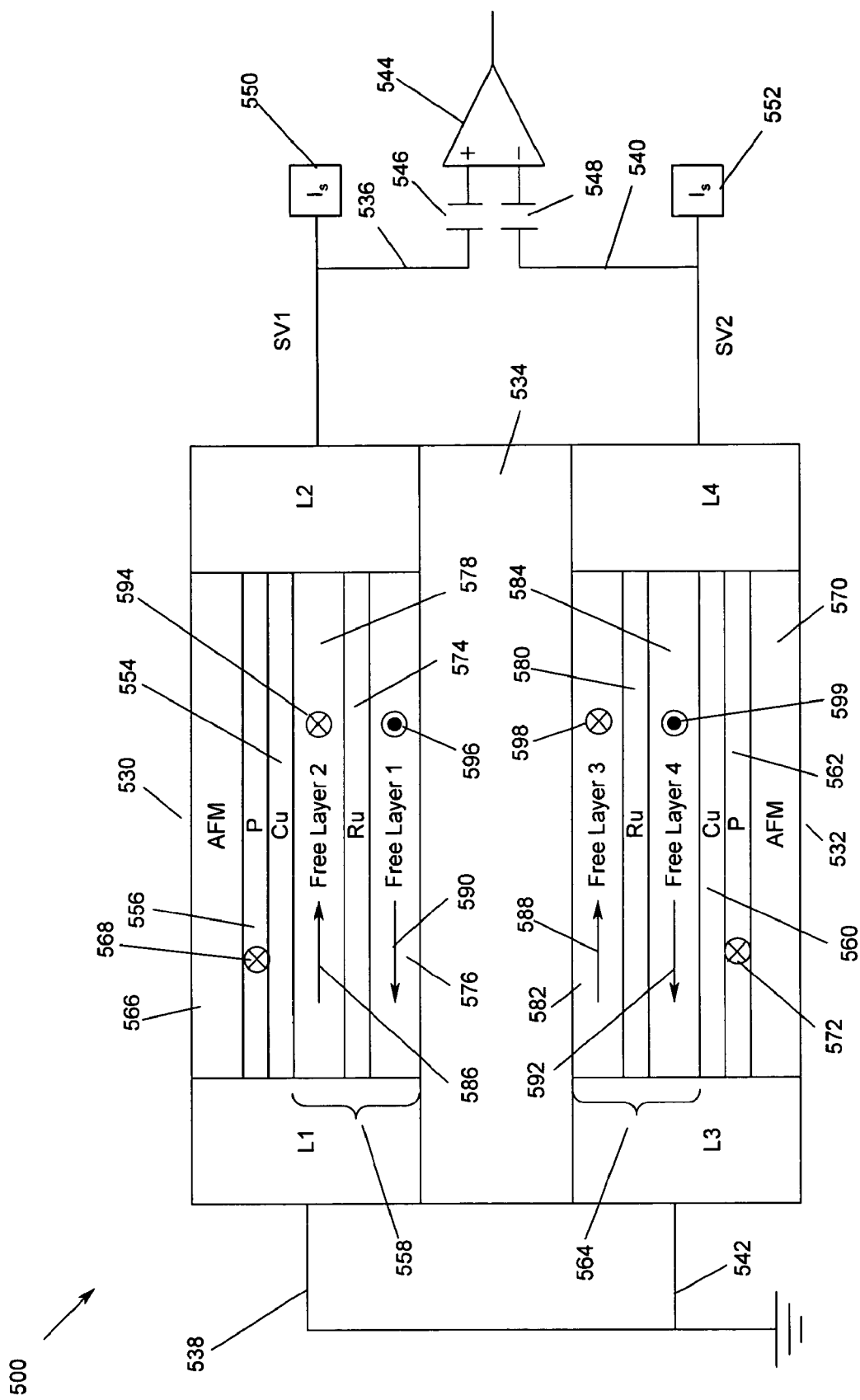
FIG. 5 illustrates a differential spin valve read head 500 that employs first and second spin valve sensors.

FIG. 5 illustrates a differential spin valve read head 500 that employs first and second spin valve sensors 530 and 532. Spin valve sensors 530 and 532 are separated by a gap or insulation layer 534, such as $Al_2O_3$. As shown in FIG. 5, the first spin valve sensor 530 is connected in series with first and second leads 536 and 538, and the second spin valve sensor 532 is connected in series with third and fourth leads 540 and 542. The type of connections may be contiguous junctions, as shown in FIG. 5. The leads 538 and 542 may be interconnected to ground and the leads 536 and 540 may be connected across a differential amplifier 544 via first and second capacitors 546 and 548. First and second sense current sources 550 and 552 are connected to the second and fourth leads 536 and 540 respectively so that a sense current $I_s$ is conducted through each of the spin valve sensors 530 and 532 to ground.

The spin valve sensors 530 and 532 are configured so as to produce response signals with opposite polarity so that the response signals can be differentially processed by the differential amplifier 544 to achieve common mode noise rejection. The differential amplifier 544 is part of the processing circuitry 150 or data channel 140 as shown in FIG. 1. The 180° out of phase response signals produced by the spin valve sensors 530 and 532 are added by the differential amplifier 544 while the common mode noise is cancelled.

The spin valve sensor 530 includes a first thin spacer layer 554, which is sandwiched between a pinned layer 556 and a laminated free layer 558. The spin valve sensor 532 includes a thin spacer layer 560, which is sandwiched between a pinned layer 562 and a laminated free layer 564. The spin valve sensor 530 further includes an antiferromagnetic layer (AFM) 566 which interfaces with the pinned layer 556 to pin its magnetic orientation into the paper by exchange coupling, as shown by the arrow 568. In a like manner, the spin valve sensor 532 includes an antiferromagnetic layer (AFM) 570 which interfaces with the pinned layer 562 to orient the magnetization of the pinned layer into the paper by exchange coupling, as shown by the arrow 572.

The antiferromagnetic layers 566 and 570 may be constructed of the same material, such as FeMn, with the same blocking temperature, so that the magnetic orientations 568 and 572 are parallel with respect to one another and perpendicular to the ABS. Optionally, the magnetic orientations 568 and 572 could be directed out of the paper if desired. With this arrangement, the magnetic orientations of the antiferromagnetic layers 566 and 570 are established during fabrication by subjecting these layers to heat of 200 C. under a magnetic field, which is directed out of the paper.

The laminated free layer 558 includes a very thin ruthenium (Ru) layer 574, which is sandwiched between first and second ferromagnetic free layers 576 and 578. The laminated free layer 564 includes a very thin ruthenium (Ru) layer 580, which is sandwiched between third and fourth ferromagnetic free layers 582 and 584. There is a strong exchange coupling between the first and second ferromagnetic free layers 576 and 578 and between the ferromagnetic free layers 582 and 584.

In the differential spin valve read head 500 shown in FIG. 5, the orientations of the magnetic moments of the second and third ferromagnetic free layers 578 and 582 are aligned parallel with respect to one another in the same direction parallel to the ABS during fabrication, such as shown by the magnetic moments 586 and 588. Optionally, these magnetic moments could be aligned in an opposite direction. Since the second ferromagnetic free layer 578 is antiferromagnetically exchange coupled to the first ferromagnetic free layer 576, the magnetic moment 590 of the first ferromagnetic free layer 576 is antiparallel to the magnetic moment 586. In the same manner, since the third ferromagnetic free layer 582 is antiferromagnetically exchange coupled to the fourth ferromagnetic free layer 584, the magnetic moment 592 of the fourth ferromagnetic free layer is antiparallel to the magnetic moment 588 of the third ferromagnetic free layer.

In a quiescent state of the read head 500, namely during sense current conduction but no applied signal, the magnetic orientations of the free layers are as shown at 586, 588, 590 and 592. Upon excitation by a field signal from a rotating disk, these magnetic moments will be rotated relative to the fixed magnetic moments 568 and 572 of the pinned layers 556 and 562. The spin valve effect for the first spin valve 530 occurs only between the relative rotation of the magnetic moment 586 of the second ferromagnetic free layer 578 and the magnetic moment 568 of the pinned layer 556.

Since the first free layer 576 is located outside of the mean free path of the conduction electrons of the sense current, the rotation of its magnetic moment 590 has no influence upon the spin valve effect. In a like manner, it is the rotation of the magnetic moment 592 of the fourth ferromagnetic free layer 584 relative to the magnetic moment 572 of the pinned layer 562 which causes a spin valve effect for the spin valve sensor 532. In a like manner, since the third ferromagnetic free layer 582 is beyond the mean free path of the conduction electrons of the sense current, the rotation of its magnetic moment 588 has no influence upon the spin valve effect.

When encountering a magnetic field from a rotating disk, the thicker free layers 578 and 582 will rotate in the same direction. Since the thinner ferromagnetic free layers 576 and 584 are strongly exchange-coupled to the thicker layers 578 and 582, their magnetic moments 590 and 592 will follow the magnetic moments 586 and 588 respectively. Free layer 1 576 is rigidly antiparallel-coupled to free layer 2 578 and similarly free layer 3 582 is rigidly antiparallel-coupled to free layer 4 584.

These layers maintain antiparallel magnetization orientation while responding to magnetic fields. Assuming a magnetic field directed into the paper, the magnetic moment 586 of the second ferromagnetic free layer 578 will rotate into the paper toward saturation, as shown by the arrow 594. When the magnetic moment 594 of the second ferromagnetic free layer is parallel to the magnetic moment 568 of the pinned layer 556, the resistance of the spin valve sensor 530 is minimum. The magnetic moment 590 of the ferromagnetic free layer 576 will rotate in an opposite direction to the magnetic moment 586 of the second ferromagnetic free layer 578, as shown by the arrow 596.

In a like manner, with an applied signal into the paper, the magnetic moment 588 of the third ferromagnetic free layer 582 will rotate into the paper toward saturation, as shown by the arrow 598. The magnetic moment 592 of the fourth ferromagnetic free layer 584 will rotate out of the paper, as shown by the arrow 599. Since the magnetic moment 599 of the fourth ferromagnetic free layer is out of the paper, and the magnetic moment 572 of the pinned layer 562 is into the paper, they are antiparallel and the resistance of the spin valve sensor 532 is at a maximum to the sense current. If the field signal from the rotating disk was out of the paper instead of into the paper, the arrows 594, 596, 598 and 599 would be reversed in direction.

Accordingly, when the spin valve read head 52 is subjected to a magnetic field of one polarity, the spin valve sensor 530 will produce a response signal of one polarity and the spin valve sensor 532 will produce a second signal of opposite polarity. The response signals are 180° out of phase with respect to one another and are differentially detected by the differential amplifier 144, which combines the response, signals to produce an enhanced response signal free of the noise picked up by the sensors due to common mode noise rejection.

While a differential GMR head provides an increased signal to noise ratio, the differential GMR head is significantly thicker than a single pinned spin valve sensor because of the thicknesses of the first and second pinning layers. While the thicknesses of the various layers of a typical spin valve sensor range between 10 Å-70 Å, the thicknesses of the antiferromagnetic pinning layers vary in a range from 120 Å-425 Å. Iridium manganese (IrMn) permits the thinnest antiferromagnetic pinning layer of about 120Å whereas an antiferromagnetic pinning layer composed of nickel oxide (NiO) is typically 425 Å.

Further, the range of blocking temperature for the interface at the antiferromagnetic layer is relatively low. These temperatures can be reached by certain thermal effects during operation of the disk drive, such as an increase in the ambient temperature inside the drive, heating of the SV sensor due to the bias current, and rapid heating of the SV sensor due to the head carrier contacting asperities on the disk. In addition, during assembly of the disk drive the SV sensor can be heated by current resulting from an electrostatic discharge. If any of these thermal effects cause the SV sensor to exceed the antiferromagnet's blocking temperature the magnetization of the pinned layer will no longer be pinned in the desired direction. This will lead to a change in the SV sensor's response to an externally applied magnetic field, and thus to errors in data read back from the disk.

Figure 6:
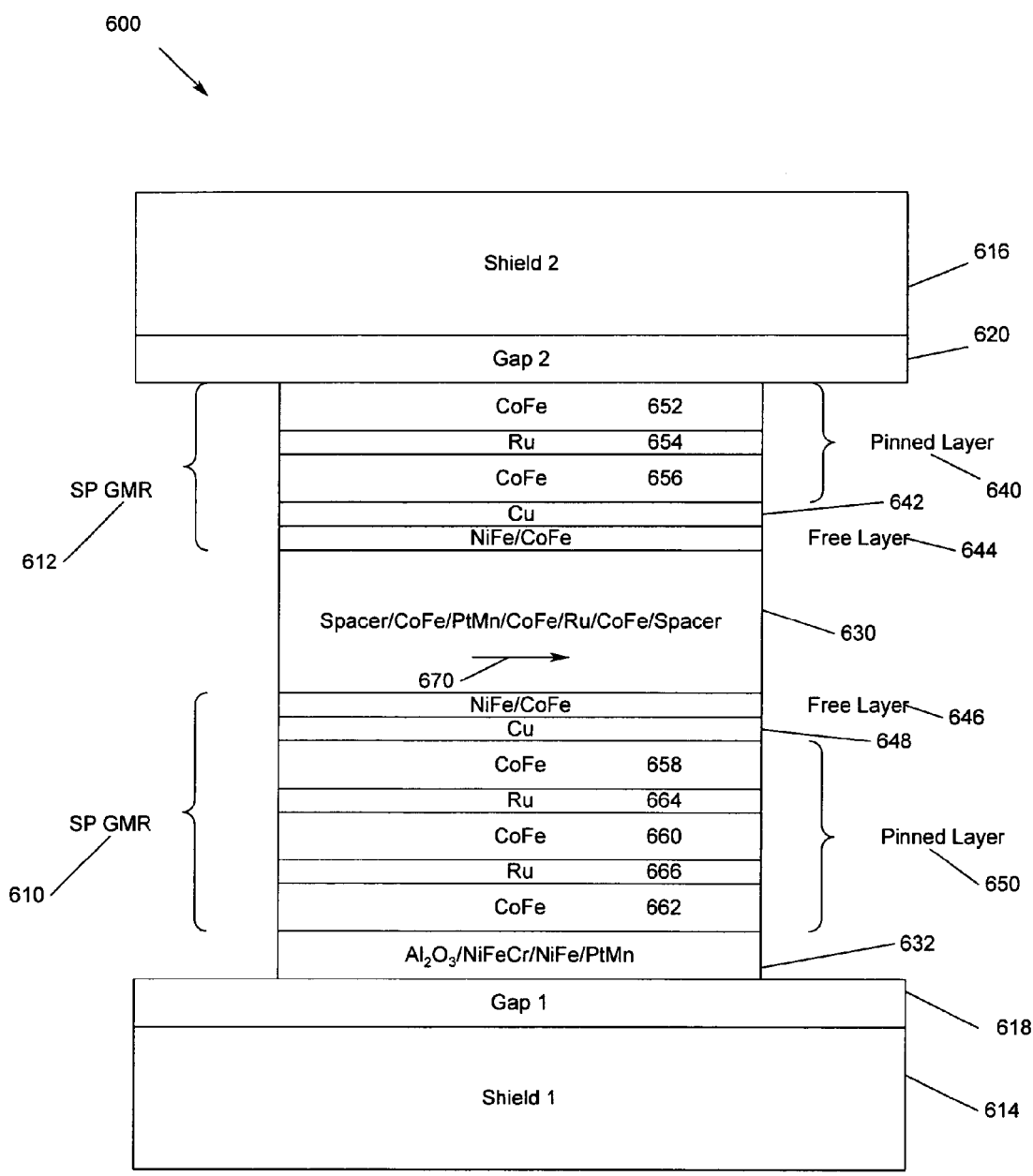
FIG. 6 illustrates a differential GMR head with self-pinned sensors according to an embodiment of the present invention.

Accordingly, a differential GMR head is needed that eliminates the need for antiferromagnetic (AFM) pinning layers. FIG. 6 is a stack 600 representing a differential GMR head with self-pinned sensors according to an embodiment of the present invention. In FIG. 6, the differential GMR head 600 is simplified by using self-pinned GMR sensors 610, 612 without antiferromagnetic (AFM) layers. The AFM layer is usually used to pin the direction of the reference (pinned) ferromagnetic layer, while the free, ferromagnetic layer rotates due to the magnetic field from the recording medium. However, the total spin valve thickness must significantly decrease, and the sensitivity and stability must increase for future heads. Because the AFM film is by far the thickest layer, reducing or eliminating this thickness is crucially important. This is especially true in a differential GMR head wherein two spin valve sensors are employed.

In FIG. 6, first 610 and second 612 self-pinned GMR sensors are formed proximate to shield one 614 and shield two 616 respectively. Gap layers 618, 620 are formed between the first 610 and second 612 self-pinned GMR sensors and the shields 614, 616. An in-stack stabilization structure 630 separates the first 610 and second 612 self-pinned GMR sensors. The in-stack stabilization structure 630 may include an AFM layer and thus may easily be set in the longitudinal direction indicated by arrow 670. Those skilled in the art will recognize that the arrow could be set to point in the opposite direction. A seed layer 632 is formed between the bottom gap layer 618 and the bottom self-pinned GMR sensor 610.

The top self-pinned GMR sensor 612 includes a free layer 644, a copper spacer 642 and a pinned layer 640. The pinned layer 640 includes two ferromagnetic layers 652, 654 and an interlayer 656. The bottom self-pinned GMR sensor 610 includes a free layer 646, a copper spacer 648 and a pinned layer 650. The bottom pinned layer 650 is implemented using three ferromagnetic layers 658, 660, 662 and two interlayers 664, 666 in the bottom self-pinned GMR sensor 610. The bottom ferromagnetic layer 662 of the bottom spin valve 610 and the top ferromagnetic layer 652 of the top spin valve 612 are set using a high field reset allowing 180° magnetization phase between the pinned layers 656, 658 that are next to the copper layers 642, 648.

Figure 7:
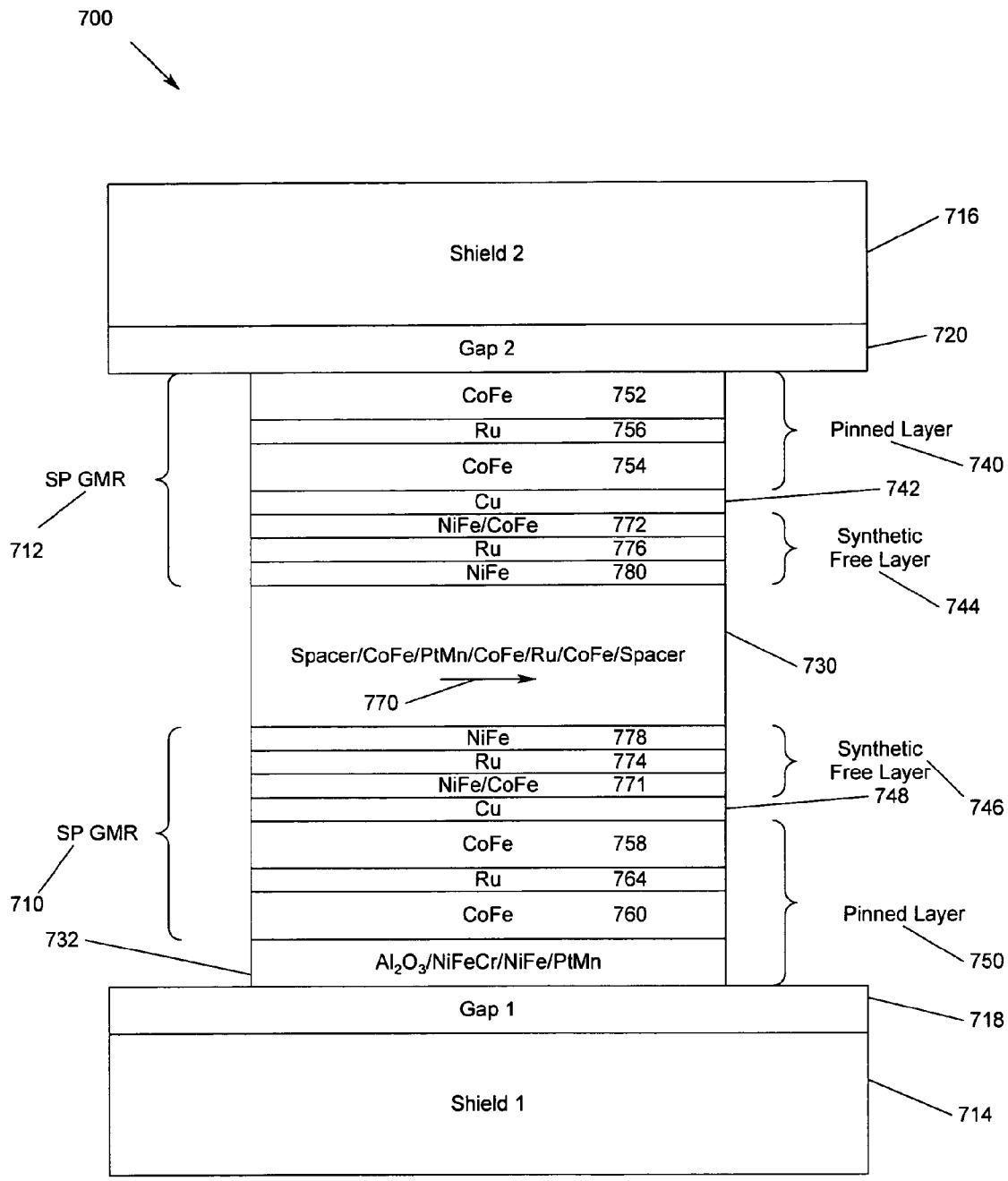
FIG. 7 illustrates a differential GMR head with synthetic free layers having antiparallel magnetizations according to an embodiment of the present invention.

FIG. 7 is a stack 700 representing a differential GMR head with synthetic free layers having antiparallel magnetizations according to an embodiment of the present invention. In FIG. 7, first 710 and second 712 self-pinned GMR sensors are formed proximate to shield one 714 and shield two 716 respectively. Gap layers 718, 720 are formed between the first 710 and second 712 self-pinned GMR sensors and the shields 714, 716. An in-stack stabilization structure 730 separates the first 710 and second 712 self-pinned GMR sensors. Again, the in-stack stabilization structure 730 may include an AFM layer and thus may easily be set in the longitudinal direction indicated by arrow 770. Those skilled in the art will recognize that the arrow could be set to point in the opposite direction. A seed layer 732 is formed between the bottom gap layer 718 and the bottom self-pinned GMR sensor 710.

The top self-pinned GMR sensor 712 includes a synthetic free layer 744, a copper spacer 742 and a pinned layer 740. The bottom self-pinned GMR sensor 710 includes a synthetic free layer 746, a copper spacer 748 and a pinned layer 750. The synthetic free layers 744, 746 include first free layers 772, 771, interlayers 774, 776 and second free layers 778, 780. The synthetic free layers 744, 746 are set 180° out of phase by in-stack exchange stabilization 730. The bias of the in-stack exchange bias structure 730 achieves 180° out of phase bias through arrangement of the bias layers. The net magnetostatic bias from the pinned layers 760/758 and 752/754 is set to zero. It is also possible to achieve 180° out of phase biasing using opposite sign of exchange bias, either by spacer 756/764 thickness selection or material selection, e.g., Ru, Cu, etc. The pinned layers 740, 750 are self-pinned for both top 712 and bottom 710 sensors—either by magnetostriction/stress or $H_c$ pinned. The thicknesses of the synthetic free layers 744, 746 are selected to provide differential operation together with in-phase pinned layers 740, 750.

Figure 8:
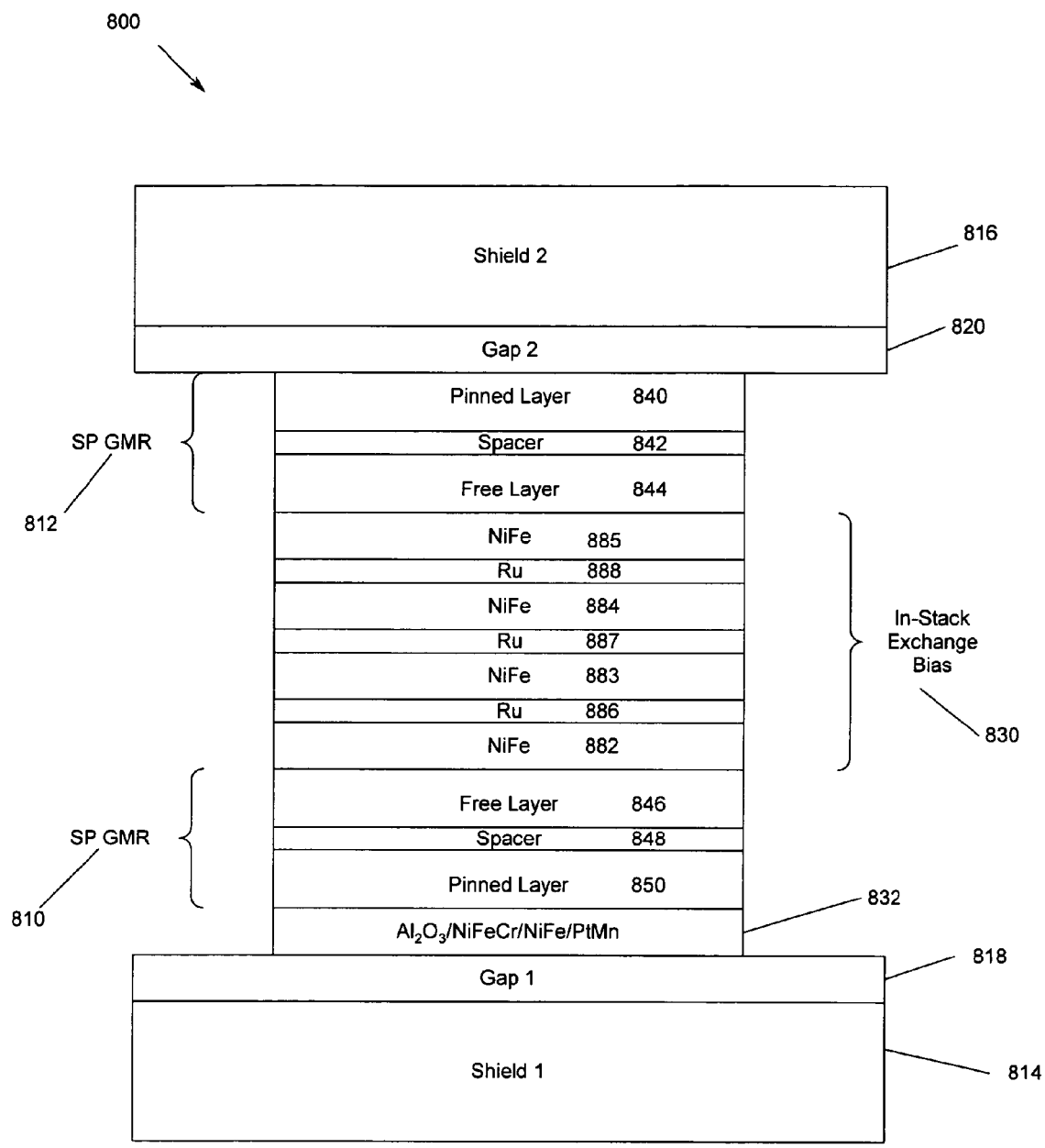
FIG. 8 illustrates a differential GMR head having an in-stack exchange bias structure according to an embodiment of the present invention.

FIG. 8 is a stack 800 representing a differential GMR head having an in-stack exchange bias structure according to an embodiment of the present invention. The in-stack exchange bias structure 830 of FIG. 8 achieves antiparallel magnetizations for the free layers 844 without using antiferromagnetic layer in the bias structure 830. The in-stack exchange bias structure 830 of FIG. 8 also allows changing the gap length.

In FIG. 8, first 810 and second 812 self-pinned GMR sensors are formed proximate to shield one 814 and shield two 816 respectively. The first 810 and second 812 self-pinned GMR sensors include pinned layers 840, 850, spacers 842, 848 and free layers 844, 846. Gap layers 818, 820 are formed between the first 810 and second 812 self-pinned GMR sensors and the shields 814, 816. A seed layer 832 is formed between the bottom gap layer 818 and the bottom self-pinned GMR sensor 810. The in-stack exchange bias structure 830 separates the first 810 and second 812 self-pinned GMR sensors. The in-stack exchange bias structure 830 includes four ferromagnetic layers 882, 883, 884, 885, such as NiFe, separated by interlayers 886, 887, 888, such as Ru.

The net moment of the in-stack exchange bias structure 830 is chosen to be zero. The Ni content of the ferromagnetic layers 882, 883, 884, 885 is preferably greater than 90%. The stress induced magnetic anisotropy of the ferromagnetic layers 882, 883, 884, 885 achieves pinning parallel to the air bear surface. The in-stack exchange bias structure 830 provides antiparallel magnetizations of the free layers 844, 846 through exchange coupling. The thickness of the in-stack exchange bias structure 830 can be tailored by selecting an even number of ferromagnetic layers 882, 883, 884, 885. Removal of antiferromagnet (AFM) from the in-stack exchange bias structure 830 removes unwanted series resistance as well as makes setting of the ferromagnetic layers 882, 883, 884, 885 easier. The thicknesses of the spacer layers 888/886 should be selected to provide the desired bias.

Figure 9:
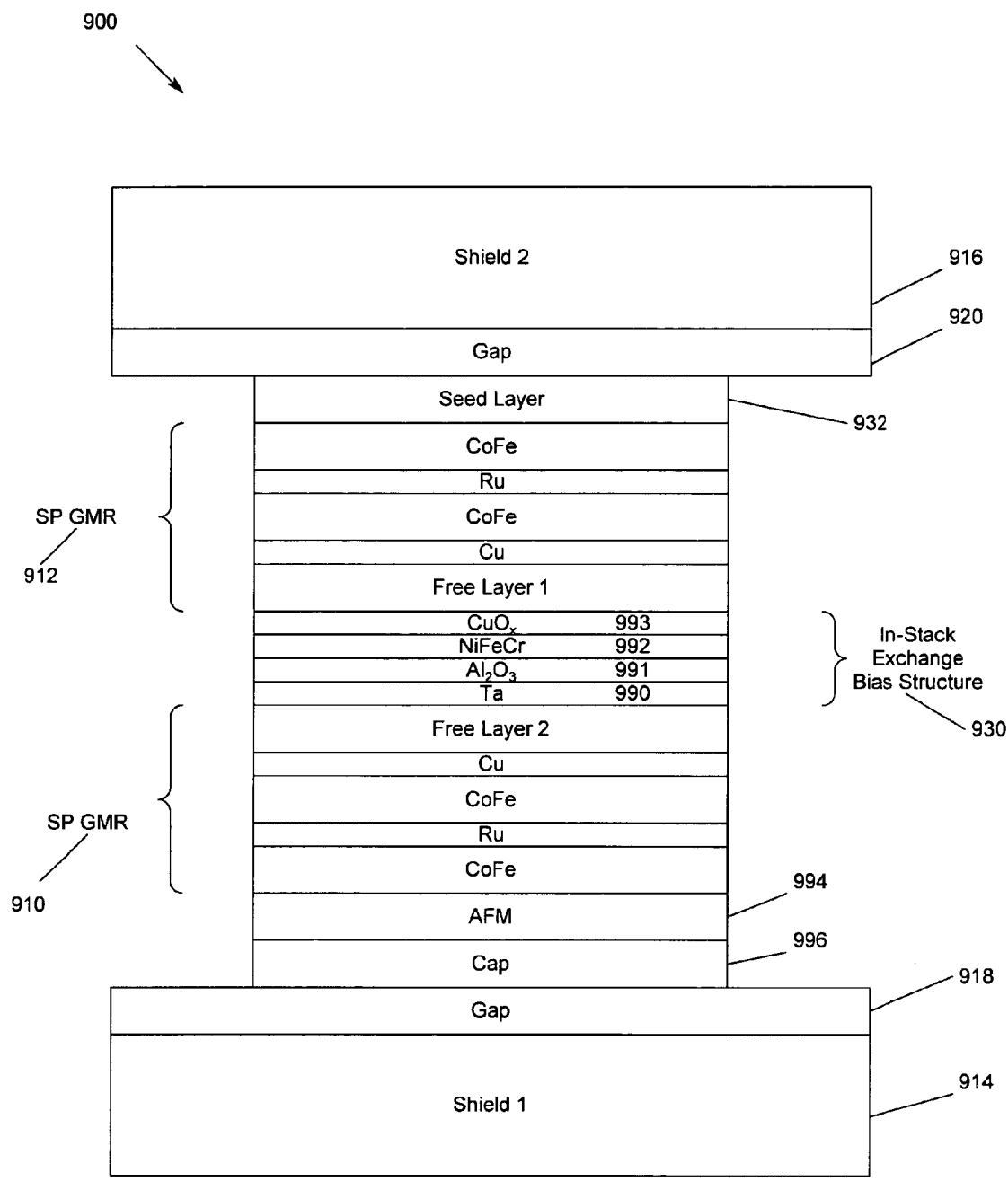
FIG. 9 illustrates a differential GMR head having a gap layer structure according to an embodiment of the present invention.

FIG. 9 is a stack 900 representing a differential GMR head having a gap layer structure according to an embodiment of the present invention. The intermediate gap layer structure 930 according to an embodiment of the present invention achieves a high dR/R for the top GMR sensor 912 as well as providing less current shunting. In FIG. 9, first 910 and second 912 self-pinned GMR sensors are formed proximate to shield one 914 and shield two 916 respectively. Gap layers 918, 920 are formed between the first 910 and second 912 self-pinned GMR sensors and the shields 914, 916. A seed layer 932 is formed between the top gap layer 920 and the top self-pinned GMR sensor 912. An intermediate gap layer 930 separates the first 910 and second 912 self-pinned GMR sensors. The intermediate gap layer has a structure defined as Ta/$Al_2O_3$/NiFeCr/$CuO_x$ 990-993. The bottom GMR sensor 910 is disposed over an antiferromagnet layer 994. The Antiferromagnet layer 994 is disposed over a cap layer 996.

Figure 10:
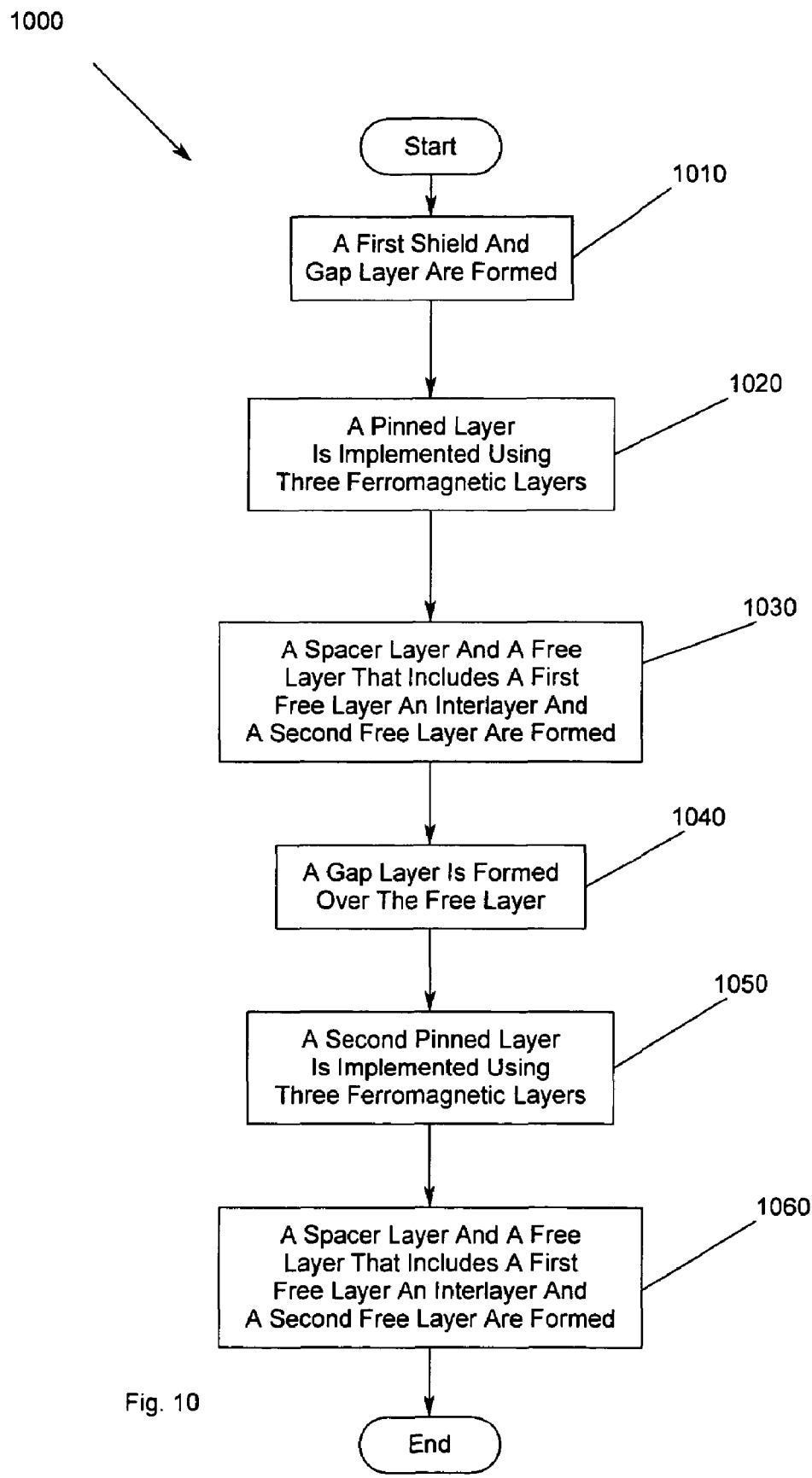
FIG. 10 illustrates a method for forming a differential GMR head according to an embodiment of the present invention.

FIG. 10 illustrates a method for forming a differential GMR head according to an embodiment of the present invention. The method described with reference to FIG. 10 includes features from all of the embodiments described above. However, one skilled in the art will recognize that the method for forming a differential GMR head according to embodiments of the present invention is not meant to require every feature shown.

In FIG. 10, a first shield and gap layer are formed. A first GMR sensor is formed 1010. The first GMR sensor includes a pinned layer implemented using three ferromagnetic layers 1020 to provide 180° magnetization phase between the pinned layers that are next to the spacer layers. The first GMR sensor also includes a spacer layer and a free layer 1030. The free layer includes a first free layer an interlayer and a second free layer. A gap layer is formed over the first GMR sensor 1040. The gap layer provides an in-stack exchange bias structure that provides antiparallel magnetizations for the free layers without using antiferromagnetic layer. The gap layer may include four ferromagnetic layers such as NiFe separated by an interlayer such as Ru. The gap layer may alternatively includes a layer have a structure of Ta/$Al_2O_3$/NiFeCr/$CuO_x$. A second GMR sensor is formed over the gap layer. The first GMR sensor includes a pinned layer implemented using three ferromagnetic layers 1050 to provide 180° magnetization phase between the pinned layers that are next to the spacer layers. The first GMR sensor also includes a spacer layer and a free layer 1060. The free layer includes a first free layer an interlayer and a second free layer.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for forming a differential GMR sensor, comprising:

forming a first shield and first gap layer;

forming a first self-pinned GMR sensor having a first pinned layer, a first spacer layer and a first free layer;

forming a bias structure over the first free layer, wherein the bias structure comprises layers of ferromagnetic and non-magnetic material selected to provide a net-zero magnetic moment; and forming a second self-pinned GMR sensor having a second pinned layer, a second spacer layer and a second free layer, wherein the bias structure is further formed to provide antiparallel magnetizations for the first and second free layers without using an antiferromagnetic layer;

wherein the forming the bias structure further comprises forming four ferromagnetic layers separated with three interlayers.

2. The method of claim 1, wherein the forming four ferromagnetic layers separated with three interlayers further comprises forming four ferromagnetic layers separated with three interlayers selected to provide a desired gap length.

3. The method of claim 1, wherein the forming four ferromagnetic layers separated with three interlayers further comprises forming three interlayers comprising ruthenium.

4. The method of claim 1, wherein the forming four ferromagnetic layers further comprises forming four NiFe layers.

5. The method of claim 4, wherein the forming four NiFe layers further comprises forming four NiFe layers having a nickel composition of 90%.

* * * * *